United States Patent
Dubovsky (10) Patent No.: US 6,949,843 B2
(45) Date of Patent: Sep. 27, 2005

(54) GRID-CONNECTED POWER SYSTEMS HAVING BACK-UP POWER SOURCES AND METHODS OF PROVIDING BACK-UP POWER IN GRID-CONNECTED POWER SYSTEMS

(75) Inventor: Stephen M. Dubovsky, Silver Spring, MD (US)

(73) Assignee: Morningstar, Inc., Columbia, MD (US)

( * ) Notice: Subject to any disclaimer, the term of this patent is extended or adjusted under 35 U.S.C. 154(b) by 0 days.

(21) Appl. No.: 10/664,940

(22) Filed: Sep. 22, 2003

(65) Prior Publication Data

US 2005/0006958 A1 Jan. 13, 2005

Related U.S. Application Data

(60) Provisional application No. 60/486,214, filed on Jul. 11, 2003.

(51) Int. Cl.$^7$ .................................................. H02J 3/04
(52) U.S. Cl. ........................................................ 307/64
(58) Field of Search ............................. 307/23, 43, 44, 307/64, 65, 66, 80

(56) References Cited

U.S. PATENT DOCUMENTS

| | | | |
|---|---|---|---|
| 3,419,779 A | 12/1968 | Zehner | |
| 3,600,599 A | 8/1971 | Wright et al. | |
| 5,222,117 A | 6/1993 | Sakakihara | |
| 5,493,155 A | 2/1996 | Okamoto et al. | |
| 5,522,944 A | 6/1996 | Elazari | |
| 5,592,074 A | 1/1997 | Takehara | |
| 5,716,442 A | 2/1998 | Fertig | |
| 5,929,538 A | 7/1999 | O'Sullivan et al. | |
| 6,215,202 B1 * | 4/2001 | Luongo et al. | 307/64 |
| 6,344,985 B1 | 2/2002 | Akerson | |
| 6,353,304 B1 | 3/2002 | Atcitty et al. | |
| 6,370,050 B1 | 4/2002 | Peng et al. | |
| 6,448,489 B2 | 9/2002 | Kimura et al. | |
| 6,487,096 B1 * | 11/2002 | Gilbreth et al. | 363/35 |
| 6,506,622 B1 | 1/2003 | Shiozaki | |
| 6,559,559 B2 * | 5/2003 | Cratty | 307/64 |
| 2003/0038713 A1 | 2/2003 | Plude et al. | |
| 2003/0072977 A1 | 4/2003 | Speranza et al. | |

OTHER PUBLICATIONS

Advanced Energy, Inc. publication "Grid–Connected MultiMode Power Conversion System", 2–pages.
Advanced Energy, Inc. publication "GC–1000 1kW Grid–Connected Photovoltaic Inverter", and "AM–100 Inverter Monitor", 2 pages.

* cited by examiner

Primary Examiner—Adolf Berhane (57) ABSTRACT

A grid-connected power system includes a primary power source, a back-up power source, a DC/AC inverter and a DC/DC converter. Direct current from the primary power source is supplied to the DC/AC inverter to obtain an alternating current output supplied to a utility grid when power from the utility grid is available to power a load. The output of the inverter is supplied to a selected portion of the load when power from the utility grid is unavailable to the load. Direct current from the back-up power source is supplied to the inverter through a DC/DC converter when power from the utility grid is unavailable to the load. The DC/DC converter converts the voltage of direct current from the back-up power source to direct current having a voltage compatible with the voltage of the primary power source and the inverter. The back-up power source may be charged by the primary power source or by the utility grid. Methods of providing back-up power include converting the voltage of direct current from a back-up power source to direct current of converted voltage and supplying the direct current of converted voltage to a DC/AC inverter.

41 Claims, 2 Drawing Sheets

GRID-CONNECTED POWER SYSTEMS HAVING BACK-UP POWER SOURCES AND METHODS OF PROVIDING BACK-UP POWER IN GRID-CONNECTED POWER SYSTEMS

CROSS-REFERENCE TO RELATED PATENT APPLICATION

This application claims priority from provisional patent application Ser. No. 60/486,214 filed Jul. 11, 2003, the entire disclosure of which is incorporated herein by reference.

BACKGROUND OF THE INVENTION

1. Field of the Invention

The present invention relates generally to grid-connected power systems and, more particularly, to grid-connected photovoltaic (PV) systems and other grid-connected power systems having a battery or other back-up power source for powering a selected portion of a load when grid power to the load is unavailable.

2. Discussion of the Related Art

Photovoltaic (PV) systems in which PV cells generate electricity from sunlight to power a load have been increasing in popularity due to the ever improving efficiency and cost-effectiveness of PV systems. Stand-alone PV systems are not connected to the electric utility grid and generally comprise an array of PV cells and a battery that is charged with electric current produced by the PV array. Electric current from the battery is used to power the load, with the battery providing a stable power source for the load. Since direct current (DC) electricity produced by the PV array is supplied to a DC battery, current output from the battery will be in a form to power a DC load. Where the load to be powered by the battery is an alternating current (AC) load, current output from the battery is typically supplied to a DC/AC inverter for converting the direct current of the battery into alternating current to be supplied to the load.

Grid-connected power systems have been implemented which are connected to the AC electric utility grid, and one type of grid-connected power system is a grid-connected PV system. In grid-connected PV systems, direct current generated by the PV array is supplied to the utility grid as alternating current via a DC/AC inverter. The utility grid is connected to a load so that power from the utility grid may be used to power the load. A battery is not necessary in grid-connected PV systems since current from the PV array may be supplied to the DC/AC inverter without an intervening battery. However, the DC/AC inverter used in grid-connected PV systems must be capable of converting the direct current of the PV array into alternating current that is compatible with the alternating current of the utility grid. Grid-connected PV systems may be installed at various locations having loads powered by the utility grid. Representative installations include residential and commercial buildings having AC loads such as lighting and appliances.

The power supplied to the utility grid from grid-connected PV systems allows consumers of utility power to reduce their utility power consumption while utilizing a safe, non-polluting, renewable power source. By reducing their utility power consumption, consumers may realize savings in utility costs, particularly where the utility employs a stepped rate schedule by which the rate charged to consumers for utility power increases in accordance with increasing utility power usage. Aside from the economic or commercial benefits, grid-connected PV systems appeal to many consumers for their lack of detrimental environmental impact.

A drawback of many grid-connected PV systems arises when utility service interruptions result in the unavailability of grid power to the load. When this occurs, the DC/AC inverter is required for safety reasons to be disconnected from the utility grid such that the PV system is also disconnected from the utility grid. In the absence of a back-up power source, no power is available from either the utility grid or the PV system to power the load. Consequently, the load may be down until utility service is restored to the load whereupon the DC/AC inverter is reconnected to the utility grid.

In order to address the problem of utility service interruptions, grid-connected PV systems are sometimes provided with a battery forming a back-up power source for powering a selected load while the PV system is disconnected from the utility grid due to unavailability of grid power to the load. Typically, the selected load is less than the entire load normally receiving power from the utility grid and may comprise a selected portion of the load of particular importance to the consumer. The back-up battery may be charged with current from the PV array. Direct current output from the back-up battery is supplied to the DC/AC inverter, which can be electrically connected with the selected load via a transfer switch. Alternating current output from the inverter can be used to power the selected load in a stand-alone mode, such that the inconvenience to consumers resulting from utility service interruptions is minimized.

Prior grid-connected PV systems having a battery back-up utilize back-up batteries providing 48VDC nominal, or less, which disadvantageously limits voltage output from the PV array and voltage input to the DC/AC inverter to 48VDC nominal, or less. At this voltage, the peak conversion efficiency of the DC/AC inverter is usually less than 90% on account of undesirable power losses. In addition, the DC/AC inverter may be undesirably heavy and/or large in physical size and is usually high in cost despite its relatively low voltage input and high inefficiency. DC/AC inverters are available which are capable of stepping up or increasing voltage through the inverters. However, such inverters ordinarily rely on transformers within the inverters, which result in greater efficiency losses through the inverters.

Another disadvantage of prior grid-connected PV systems with a battery back-up relates to the manner in which the battery is charged by the PV array. A grid-connected PV system of Advanced Energy Inc. includes a DC/DC converter receiving as input all of the current coming from the PV array, with the output of the DC/DC converter being provided as input to a back-up battery and/or a DC/AC inverter. Current output from the DC/DC converter is taken by the battery as needed to compensate for loss of battery charge due to powering the load and/or self-discharging, thereby maintaining the battery fully charged. Power is undesirably lost by all of the current from the PV array going through the DC/DC converter prior to being supplied to the battery and/or the DC/AC inverter.

It is oftentimes desired to add a battery back-up to a grid-connected PV system initially installed without a battery back-up. The addition of a battery back-up to grid-connected PV systems initially installed without a battery back-up may be essentially precluded in some cases due to the extensive and costly modifications required. In other cases, grid-connected PV systems that are to be initially installed without a battery back-up must be specifically designed to permit the addition of a battery back-up at a later time, and this typically adds considerable cost and/or inefficiencies to the initial system.

A power system in which a load is powered by a battery when not being powered by an electric utility grid is disclosed in U.S. Pat. No. 6,353,304 B1 to Atcitty. The battery may be charged by a PV array which may also be used to power the load.

U.S. Patent Application Publication 2003/0072977 A1 to Speranza et al relates to a power system characterized by a renewable primary power source, such as PV, in electrical communication with a bus and a bridging power source including a battery. U.S. Pat. No. 3,600,599 to Wright discloses a power system having load and return bus lines.

PV power systems implemented in conjunction with commercial power sources or utility grids, but not having back-up power sources operable when power from the utility grids is unavailable, are represented by U.S. Pat. No. 5,493,155 to Okamoto et al, No. 5,522,944 to Elazari, No. 5,592,074 to Takehara, No. 5,929,538 to O'Sullivan et al and No. 6,448,489 B2 to Kimura et al and by U.S. Patent Application Publication 2003/0038713 A1 to Jansen. The Okamoto et al patent discloses a power system in which power can be supplied to a load in parallel from a PV array and a commercial power source. The commercial power source may be used to power a VVVF inverter to which a DC voltage output from the PV array is applied. The Elazari patent discloses a PV array electrically connected to a battery bank which is electrically connected to a DC/AC inverter. The inverter converts the DC current of the battery bank into 110/220VAC to power electrical appliances. When the voltage level of the battery falls below a predetermined level, the load is connected to the utility grid. The power system disclosed in the Takehara patent is characterized by a break device between the PV power system and the commercial power system. The O'Sullivan patent relates to PV power systems having a power processor capable of operating in an inverter mode, a battery charger mode and a parallel mode. The Kimura et al patent discloses a power system including a booster unit for boosting the DC voltage output of a solar cell string. U.S. Patent Application Publication 2003/0038713 to Jansen discloses a PV system having a bidirectional conversion circuit arranged between a DC voltage bus and the utility power grid.

U.S. Pat. No. 6,370,050 B1 to Peng et al and No. 6,344,985 B1 to Akerson disclose various DC/DC and AC/DC bidirectional power converters applicable to PV systems.

A need exists for grid-connected power systems in which a high voltage primary DC power source, such as PV, and a high voltage DC/AC inverter may be used in conjunction with a relatively low voltage back-up DC power source, such as a battery, for greater efficiencies and lower costs. There is also a need for grid-connected power systems in which direct current from a back-up power source is increased or decreased in voltage to be compatible with the voltage of a primary power source and a DC/AC inverter. Another need exists for grid-connected power systems in which direct current having a first voltage supplied from a high voltage primary power source to a high voltage DC/AC inverter is reduced to a lower second voltage in order to charge a low voltage DC back-up power source. A further need exists for grid-connected power systems in which direct current having a first voltage supplied from a primary power source to a DC/AC inverter is reduced to a lower second voltage when used to charge a back-up DC power source, and direct current from the back-up power source is increased in voltage from the second voltage to the first voltage prior to being supplied to the DC/AC inverter. An additional need exists for grid-connected power systems in which direct current output from a primary power source is supplied through a DC/DC converter only as needed to charge a back-up DC power source with the output from the DC/DC converter. There is also a need for grid-connected power systems in which alternating current from a utility grid or alternating current derived from the power system is converted to DC current of appropriate voltage to charge a back-up power source of the power system. Moreover, there is a need for grid-connected power systems in which alternating current from a utility grid is converted to direct current of lower voltage than the original voltage of the alternating current to charge a low voltage back-up power source, and the lower voltage direct current of the back-up power source is increased to a higher voltage prior to being supplied to a high-voltage DC/AC inverter. An additional need exists for grid-connected power systems utilizing alternating current from a utility grid to charge a back-up DC power source when the power system is electrically connected to the utility grid in a grid-connected mode and utilizing alternating current derived from a primary DC power source to charge the back-up power source when the power system is disconnected from the utility grid in a stand-alone mode. Still another need exists for back-up power sources provided as add-on modules for grid-connected power systems initially installed without the back-up modules, wherein the add-on capability is preserved without sacrificing efficiency and economy in the initial system.

SUMMARY OF THE INVENTION

Accordingly, it is an object of the present invention to overcome the aforementioned disadvantages of grid-connected PV systems and other grid-connected power systems having a battery or other DC back-up power source.

Another object of the present invention is to improve the efficiencies of grid-connected PV systems and other grid-connected power systems having a battery or other DC back-up power source.

An additional object of the present invention is to increase or decrease the voltage of direct current from a battery or other DC back-up power source to be compatible with the voltage of a DC/AC inverter used to convert the direct current into alternating current in grid-connected PV systems and other grid-connected power systems.

It is also an object of the present invention to utilize a high voltage PV array or other high voltage DC primary power source and a high voltage DC/AC inverter in conjunction with a low voltage DC battery or other low voltage DC back-up power source in grid-connected power systems.

A still further object of the present invention is to supply direct current from a primary power source to a DC/AC inverter and to decrease or increase the voltage of the direct current from the primary power source to charge a DC back-up power source in grid-connected PV systems and other grid-connected power systems.

A further object of the present invention is to increase the voltage of direct current from a battery or other low voltage DC back-up power source prior to supplying the direct current as input to a high voltage DC/AC inverter in a grid-connected PV system or other grid-connected power system.

Moreover, it is an object of the present invention to supply direct current having a first voltage from a high voltage primary power source to a high voltage DC/AC inverter and to decrease the voltage of the direct current from the first voltage to a lower second voltage to charge a low voltage DC back-up power source in grid-connected PV systems and other grid-connected power systems.

It is another object of the present invention to decrease the voltage of direct current from a PV array or other primary power source from a first voltage to a lower second voltage to charge a battery or other DC back-up power source and to increase the voltage of direct current from the battery or other DC back-up power source from the second voltage to the first voltage prior to supplying the direct current of increased voltage to a DC/AC inverter in a grid-connected PV system or other grid-connected power system.

An additional object of the present invention is to reduce power losses in grid-connected PV systems and other grid-connected power systems having a battery or other DC back-up power source.

It is also an object of the present invention to make grid-connected PV systems and other grid-connected power systems having a battery or other DC back-up power source more cost-effective.

Moreover, it is an object of the present invention to supply direct current from a PV array or other primary power source through a DC/DC converter only as needed to charge a back-up battery or other rechargeable back-up power source in a grid-connected PV system or other grid-connected power system.

Still an additional object of the present invention is to facilitate the addition of a back-up module to a grid-connected PV system or other grid-connected power system initially installed without the back-up module, without sacrificing efficiency and economy in the initial system.

It is another object of the present invention to expand the options available to consumers for reducing electrical utility costs.

The present invention has as a further object to charge a DC back-up battery or other DC back-up power source using AC utility grid power in a grid-connected PV system or other grid-connected power system.

The present invention has as an object to charge a back-up DC power source in grid-connected PV systems or other grid-connected power systems by utilizing alternating current from a utility grid to charge the back-up power source when the power system is in a grid-connected mode and utilizing alternating current derived from the power system to charge the back-up power source when the power system is in a stand-alone mode.

The present invention has as an additional object to convert alternating current from a utility grid to direct current of appropriate voltage to charge a DC back-up battery or other rechargeable DC back-up power source in a grid-connected PV system or other grid-connected power system.

Furthermore, it is an object of the present invention to convert alternating current from a utility grid to direct current of lower voltage than the original voltage of the alternating current to charge a DC back-up power source in a grid-connected PV system or other grid-connected power system, and to increase the voltage of the direct current output of the back-up power source prior to converting the direct current output of the back-up power source to alternating current for powering a selected load when the utility grid is disconnected from the grid-connected power system.

Additionally, it is an object of the present invention to convert alternating current derived from a PV array or other primary DC power source into direct current of appropriate voltage to charge a DC battery or other rechargeable back-up DC power source in grid-connected PV systems or other grid-connected power systems.

The present Invention also has as an object to convert alternating current derived from a primary DC power source to direct current of lower voltage than the original voltage of the alternating current to charge a DC back-up power source in a grid-connected PV system or other grid-connected power system, and to increase the voltage of the direct current output of the back-up power source prior to converting the direct current output of the back-up power source to alternating current for powering a selected load when the utility grid is disconnected from the grid-connected power system.

The aforesaid objects are achieved individually and in combination, and it is not intended that the present invention be construed as requiring two or more of the objects to be combined unless expressly required by the claims attached hereto.

Some of the advantages of the present invention are that the DC/AC inverter is a high voltage inverter providing greater conversion efficiencies than low voltage inverters; the DC/AC inverter may be made lighter and/or smaller in physical size and at less cost than many low voltage inverters; the DC/AC inverter does not require a transformer for effecting a voltage increase through the inverter; a standard battery, such as 96VDC nominal, can be used as the back-up power source in conjunction with a higher voltage PV array or other primary power source and in conjunction with a higher voltage DC/AC inverter; the nominal voltage of the battery or other back-up power source may be greater than or less than the nominal voltage of the PV array or other primary power source and of the DC/AC inverter; the voltages of the PV array or other primary power source and of the DC/AC inverter do not have to be matched to the voltage of the battery or other back-up power source; the primary power source may comprise a PV array or other DC power sources including fuel cells and hydroelectric power sources; the back-up power source may comprise a DC battery or other DC power sources including fuel cells, DC gen-sets, flywheels, small power generators and (ultra) super-capacitors; charging of the battery or other back-up power source occurs, as needed, in both the grid-connected and stand-alone modes; the battery may comprise any number of battery cells or units including one or more individual batteries such as lead-acid batteries; grid-connected power systems having a back-up power source can be provided with peak efficiencies of about 96% to 97%; and grid-connected power systems may be provided which better meet the needs of consumers.

These and other objects, advantages and benefits are realized with the present invention as generally characterized in a grid-connected power system comprising a primary power source, a back-up power source, a DC/AC inverter and a DC/DC converter. The primary power source provides a direct current output having a first voltage supplied to the DC/AC inverter. The DC/AC inverter converts the direct current supplied from the primary power source into an alternating current output compatible with the alternating current of a utility grid or commercial power source. The back-up power source provides a direct current output having a second voltage, different than the first voltage, supplied to the DC/DC converter. The DC/DC converter converts the voltage of the direct current supplied from the back-up power source through the DC/DC converter from the second voltage to the first voltage to provide a direct current output having the first voltage supplied as input to the DC/AC inverter. Where the second voltage is less than the first voltage, the DC/DC converter increases the voltage of the direct current supplied from the back-up power source through the DC/DC converter from the second voltage to the first voltage. Where the second voltage is greater than the first voltage, the DC/DC converter decreases the voltage of the direct current supplied from the back-up power source through the DC/DC converter from the second voltage to the first voltage. A relatively low voltage back-up power source can be used in conjunction with a relatively high voltage primary power source and DC/AC inverter. A relatively high voltage back-up power source can be used in conjunction with a relatively low voltage primary power source and DC/AC inverter. In one embodiment, the primary power source comprises a PV array providing a direct current output having a first voltage of 200 to 600VDC nominal, the back-up power source comprises a battery providing a direct current output having a lower second voltage, such as 96 VDC nominal, and the DC/AC inverter has a 120/240VAC alternating current output compatible with the utility grid.

The DC/AC inverter is electrically connected to the utility grid to supply power to the utility grid when power from the utility grid is available to power a load, is disconnected from the utility grid when power from the utility grid is unavailable to power the load, and is electrically connected with a selected load when power from the utility grid is unavailable to power the load. The selected load comprises a selected portion of the load which may include the entire or less than the entire load. The DC/AC inverter may be connected to a transfer unit used to effect the appropriate connections and disconnections. The back-up power source and the DC/DC converter can be provided as an add-on back-up module, with or without the transfer unit, capable of being added to a grid-connected power system initially installed without the back-up module. The back-up module can be added to an existing grid-connected power system without having to sacrifice efficiency and economy in the grid-connected power system as initially installed.

When power from the utility grid is available to power the load, the DC/AC inverter is electrically connected to the utility grid, and the power system operates in a grid-connected mode. Direct current having the first voltage is supplied from the primary power source to the DC/AC inverter and is converted to alternating current supplied to the utility grid. In this manner, the amount of utility-owned power consumed by the load is reduced. When power from the utility grid is unavailable to power the load, the DC/AC inverter is disconnected from the utility grid and is electrically connected to the selected load for operation of the power system in a stand-alone mode. Depending on the power requirements of the selected load and/or the amount of power produced by the primary power source, the primary power source may or may not provide sufficient power to power the selected load in the stand-alone mode, and the deficit is provided by the back-up power source. Direct current having the second voltage is supplied from the back-up power source to the DC/DC converter, and direct current having the first voltage is supplied from the DC/DC converter to the DC/AC inverter. The DC/AC inverter converts the direct current supplied from the DC/DC converter into alternating current to power the selected load. Direct current having the first voltage may be supplied, as available, from the primary power source to the DC/AC inverter simultaneously or in conjunction with the direct current supplied to the DC/AC inverter from the DC/DC converter. Accordingly, the selected load may be powered in the stand-alone mode by alternating current derived from the primary power source alone, the back-up power source alone, or both the primary and back-up power sources together. The DC/AC inverter is reconnected to the utility grid upon the restoration of utility power to the load, and the power system will again operate in the grid-connected mode.

The present invention is also generally characterized in a grid-connected power system having a rechargeable back-up power source charged by the primary power source and/or by the utility grid. The back-up power source may thusly be maintained fully charged by replacing the charge lost due to the back-up power source powering the selected load and/or self-discharging. Where the back-up power source is to be charged with direct current from the primary power source, direct current having the first voltage is supplied from the primary power source to the back-up power source through a DC/DC converter. The DC/DC converter converts the voltage of the direct current supplied therethrough from the first voltage to the second voltage, and direct current having the second voltage appropriate to charge the back-up power source is supplied to the back-up power source from the DC/DC converter. Where the second voltage is less than the first voltage, the DC/DC converter decreases or reduces the voltage of the direct current supplied therethrough from the first voltage to the second voltage. Where the second voltage is greater than the first voltage, the DC/DC converter increases the voltage of the direct current supplied therethrough from the first voltage to the second voltage. Only an as needed portion of the direct current output of the primary power source is supplied to the DC/DC converter as needed to charge the back-up power source, with remaining direct current output of the primary power source being supplied to the DC/AC inverter. Greater efficiencies are obtained since all of the current from the primary power source is not required to go through the DC/DC converter prior to being supplied to the DC/AC inverter. The back-up power source may be charged with direct current from the primary power source in both the grid-connected and stand-alone modes of operation.

The DC/DC converter may be a bidirectional DC/DC converter through which the direct current output of the back-up power source is supplied to the DC/AC inverter when needed to power the selected load. The DC/DC converter converts the voltage of direct current supplied thereto from the back-up power source from the second voltage to the first voltage, and this direct current of converted voltage is supplied from the DC/DC converter to the DC/AC inverter. Where the second voltage is less than the first voltage, the voltage of the direct current supplied to the DC/DC converter from the back-up power source is increased by the DC/DC converter. Where the second voltage is greater than the first voltage, the voltage of the direct current supplied to the DC/DC converter from the back-up power source is decreased by the DC/DC converter. Accordingly, high voltage DC primary power sources and high voltage DC/AC inverters can be used with relatively low voltage DC back-up power sources charged with direct current from the primary power sources. Conversely, lower voltage DC primary power sources and DC/AC inverters can be used with higher voltage DC back-up power sources charged with direct current from the primary power sources.

Where the back-up power source is to be charged using alternating current from the utility grid, the alternating current from the utility grid is supplied, as needed, to the back-up power source through an AC/DC converter which converts the alternating current into direct current of appropriate voltage to charge the back-up power source. Depending on the voltage of the back-up power source, the voltage of the alternating current is increased or decreased by the AC/DC converter to match the voltage of the back-up power source. In one embodiment, the second voltage is less than the original voltage of the alternating current of the utility grid, and the alternating current supplied to the AC/DC converter from the utility grid is converted to direct current and is decreased in voltage from the original voltage of the alternating current to obtain a direct current output from the AC/DC converter having the second voltage. Direct current having the second voltage is supplied from the AC/DC converter to the back-up power source for charging the back-up power source. When power from the back-up power source is needed to power the selected load, direct current having the second voltage may be supplied from the back-up power source to the DC/AC inverter through a DC/DC converter which converts the voltage of current therethrough from the second voltage to the first voltage.

Where power from the utility grid is unavailable, the back-up power source may be charged in the stand-alone mode using alternating current derived from the power system. Alternating current output of the DC/AC inverter in excess of the alternating current needed to power the selected load is supplied to the AC/DC converter. The AC/DC converter converts the alternating current output of the DC/AC inverter into direct current of appropriate voltage to charge the back-up power source. Depending on the voltage of the back-up power source, the voltage of the alternating current is increased or decreased by the AC/DC converter to match the voltage of the back-up power source. In one embodiment, the second voltage appropriate for the back-up power source is less than the voltage of the alternating current output of the DC/AC inverter, and the alternating current supplied to the AC/DC converter from the DC/AC inverter is converted to direct current and is decreased in voltage from the voltage of the alternating current output to obtain a direct current output from the AC/DC converter having the second voltage. Direct current having the second voltage is supplied from the AC/DC converter to the back-up power source for charging the back-up power source. When power from the back-up power source is needed to power the selected load, direct current having the second voltage may be supplied from the back-up power source to the DC/AC inverter through a DC/AC converter which converts the voltage of current therethrough from the second voltage to the first voltage.

The present invention is also generally characterized in a method of providing back-up power in a grid-connected power system. The method involves providing a direct current output having a first voltage from a primary power source, converting the direct current output of the primary power source into alternating current derived from the primary power source, supplying the alternating current derived from the primary power source to a utility grid when power from the utility grid is available to power a load, providing a direct current output having a second voltage, different than the first voltage, from a back-up power source, converting the voltage of the direct current output of the back-up power source from the second voltage to the first voltage to obtain a direct current of converted voltage, converting the direct current of converted voltage into alternating current derived from the back-up power source, and supplying the alternating current derived from the back-up power source to a selected portion of the load when power from the utility grid is unavailable to the load. The method may include supplying alternating current derived from the primary power source to the selected portion of the load simultaneously with supplying alternating current derived from the back-up power source to the selected portion of the load.

The method may involve charging the back-up power source with direct current from the primary power source by converting the voltage of the direct current output of the primary power source from the first voltage to the second voltage to obtain a direct current of converted voltage and supplying the direct current of converted voltage to the back-up power source. The method may involve charging the back-up power source with alternating current from the utility grid by converting alternating current of the utility grid into direct current of the appropriate voltage to charge the back-up power source. The method may involve charging the back-up power source with alternating current derived from the power system by converting alternating current output of the DC/AC inverter into direct current of appropriate voltage to charge the back-up power source. In a preferred method, the direct current output having the first voltage is provided from a PV array and the direct current output having the second voltage is provided from a battery. The first voltage may be in the range of 200 to 600VDC nominal and the second voltage may be less than the first voltage, such as 96VDC nominal.

The above and still further objects, features and advantages of the present invention will become apparent from the following description of preferred embodiments of the invention, particularly when taken in conjunction with the accompanying drawings, wherein like reference numerals are used to designate like or similar components thereof.

DESCRIPTION OF THE PREFERRED EMBODIMENTS

Figure 1:
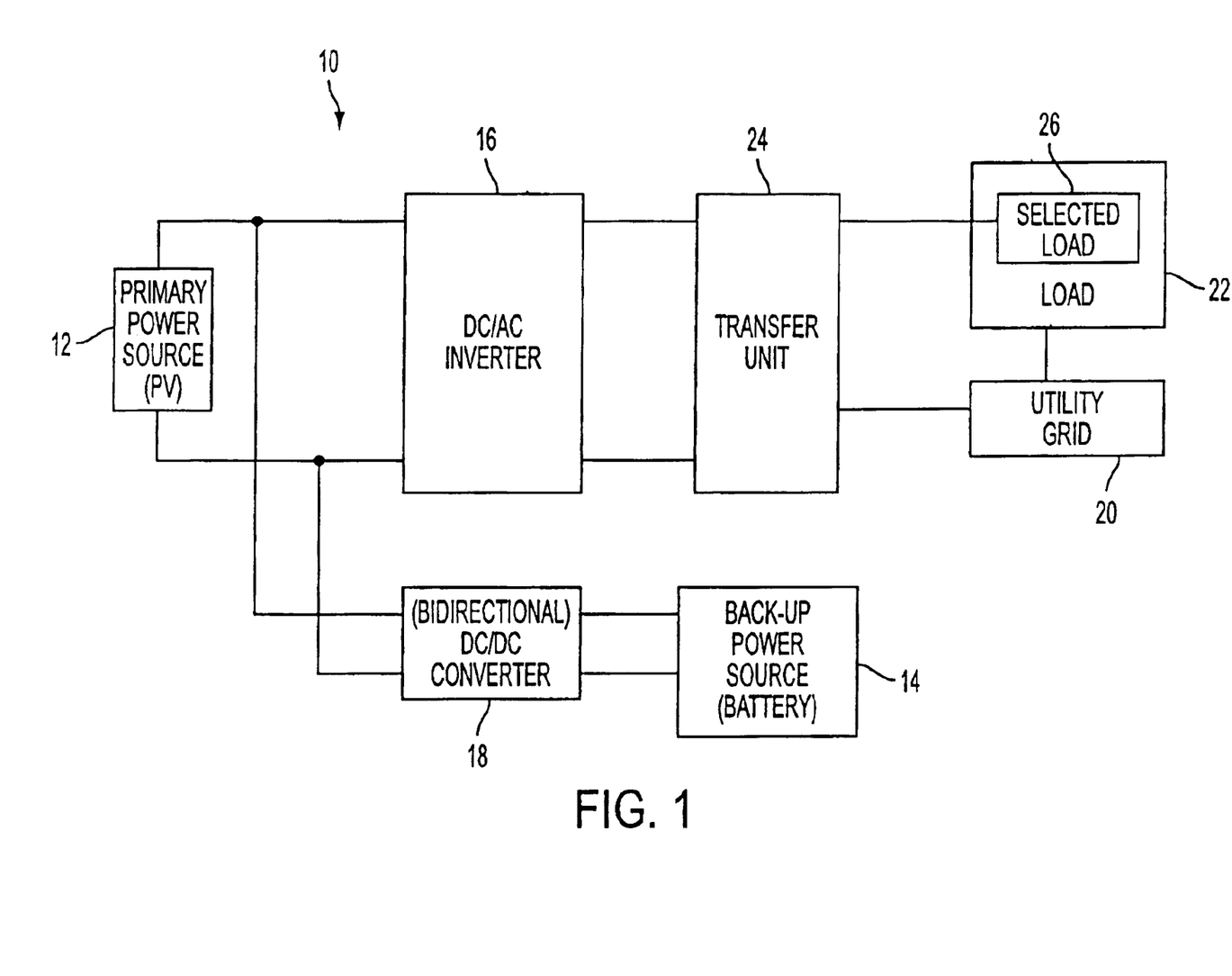
FIG. 1 is a block diagram depicting a grid-connected power system having a back-up power source in accordance with the present invention and representing a method according to the present invention of providing back-up power to a selected load in grid-connected power systems.

A grid-connected power system 10 according to the present invention is depicted in FIG. 1 and comprises a primary power source 12 providing direct current electricity, a back-up power source 14 providing direct current electricity, a DC/AC inverter 16 for converting the direct current electricity of the primary and back-up power sources into alternating current electricity, and a DC/DC converter 18. The primary power source 12 preferably comprises a photovoltaic (PV) power source including an array of PV cells which produce DC electricity from sunlight. However, the primary power source may comprise various other DC power sources, with or without PV, including fuel cells and hydroelectric power sources. The back-up power source 14 preferably comprises a rechargeable DC battery, but may comprise various other rechargeable or non-rechargeable DC power sources including fuel cells, DC gen-sets, flywheels, small power generators and (ultra) super-capacitors. The battery may comprise any number of battery cells or units, and the term "battery" is intended to encompass one or more individual batteries.

Depending on the mode of operation for the power system 10 as discussed below, the DC/AC inverter 16 receives as input the DC electricity of the primary power source 12 and/or the back-up power source 14, with direct current from the back-up power source 14 being supplied to the DC/AC inverter 16 through the DC/DC converter 18. The DC/AC inverter 16 converts the direct current electricity supplied to it into an alternating current output that is compatible with the alternating current of an electric utility grid or commercial power source 20. The electric utility grid 20 is electrically connected with an AC load 22 to be powered by the utility grid 20. The output of the DC/AC inverter 16 is supplied to the utility grid 20 through a transfer unit 24 by which the DC/AC inverter is electrically connected with the utility grid 20 when power from the utility grid 20 is available to power the load 22, is disconnected from the utility grid 20 when power from the utility grid 20 is unavailable to power the load 22, and is electrically connected with a selected load 26 when power from the utility grid 20 is unavailable to power the load 22. The transfer unit 24 may comprise any suitable switches and/or other components necessary to carry out the required connections and disconnections automatically. The selected load 26 comprises a selected portion of the load 22, and the selected portion of load 22 may be the entire or less than the entire load 22 powered by the utility grid 20. Typically, the selected load 26 will be a selected portion of load 22 that is less than the entire load 22 and of particular importance to the consumer. The load 22 may comprise, as an example, the entire electrical system for a residential or commercial building while the selected load 26 may comprise selected lighting or appliances forming part of the load 22.

The primary power source 12 provides a direct current output having a first voltage supplied as input to the DC/AC inverter 16. The back-up power source 14 provides a direct current output having a second voltage, different than the first voltage, supplied as input to the DC/DC converter 18. The DC/DC converter 18 converts the voltage of the direct current supplied to it from the back-up power source 14 from the second voltage to the first voltage, and direct current having the first voltage provided as output from the DC/DC converter 18 is supplied as input to the DC/AC inverter 16. The first voltage may be greater than or less than the second voltage. In one preferred embodiment, the primary power source 12 comprises a 200 to 600V PV array providing direct current output having a first voltage in the range of 200 to 600VDC nominal, the back-up power source 14 comprises a 96V DC battery providing a direct current output having a second voltage of 96VDC nominal, less than the first voltage, and the DC/AC inverter provides a 120VAC nominal output compatible with a 120/240VAC utility grid and load. The voltages referred to herein are nominal to the extent that small variations normally occur in electrical voltages. The second voltage could be greater than 600VDC nominal, and the DC/AC inverter could provide a 240VAC nominal output. The battery could be greater than or less than 96VDC nominal. Where PV is used as the primary power source, the amount of direct current electricity produced by the primary power source will typically vary depending on conditions such as the availability of sunlight.

When power from the utility grid 20 is available to power the load 22, the power system 10 operates in a grid-connected mode with the DC/AC inverter 16 electrically connected to the utility grid 20 via the transfer unit 24. Direct current from the primary power source 12 is supplied through the DC/AC inverter 16 and is thereby converted into alternating current compatible with the alternating current of the utility grid 20. The alternating current output of the DC/AC inverter 16 is supplied to the utility grid 20 through the transfer unit 24, and power from the utility grid 20 is used to power the load 22. Depending on the power requirements of the load 22 and/or the amount of electrical power produced by the primary power source 12, the amount of electrical power produced by the primary power source 12 may be greater than, less than or equivalent to the amount of electrical power consumed by the load 22. Where the amount of electrical power produced by the primary power source 12 is less than the amount of electrical power consumed by the load 22, the deficit is provided by utility-owned power via the utility grid 20. The AC electricity supplied to the utility grid 20 from the grid-connected power system 10 reduces the amount of utility-owned power consumed by the load 22, thusly reducing utility power consumption for the load 22. Where PV is used as the primary power source 12, the amount of utility-owned power consumed by the load 22 is reduced while utilizing a safe, non-polluting, renewable resource.

Sometimes power from the utility grid 20 may be unavailable to power the load 22, as when utility service interruptions occur resulting in no utility power to the load. When power from the utility grid 20 is unavailable to the load 22, the DC/AC inverter 16 is automatically disconnected from the utility grid 20 for safety reasons and is automatically electrically connected with the selected load 26 via the transfer unit 24. The power system 10 operates in a stand-alone mode in which power from the back-up power source 14 is supplied, as needed, to power the selected load 26. Depending on the power requirements of the selected load 26 and/or the amount of direct current electricity produced by the primary power source 12, the primary power source 12 may provide enough power to power the selected load 26 in the stand-alone mode without drawing on the back-up power source 14. Where the primary power source 12 does not produce enough direct current electricity to power the selected load 26 in the stand alone mode, the deficit is provided by the back-up power source 14. Direct current having the second voltage is supplied, as needed, from the back-up power source 14 to the DC/DC converter 18, and direct current having the first voltage is supplied from the DC/DC converter 18 to the DC/AC inverter 16. Depending on whether the second voltage is less than or greater than the first voltage, the conversion effect by the DC/DC converter 18 involves increasing or decreasing the second voltage to obtain the first voltage. Where the first voltage is 200 to 600 VDC nominal and the second voltage is 96VDC nominal, the DC/DC converter 18 increases the second voltage from 96VDC nominal to 200 to 600 VDC nominal. The direct current supplied as input to the DC/AC inverter 16 from the DC/DC converter 18 is converted to the alternating current output suitable for powering the AC selected load 26 in the stand-alone mode. The alternating current output of the DC/AC inverter 16 is supplied to the selected load 26 via the transfer unit 24.

It should be appreciated that direct current having the first voltage may be supplied, as available, from the primary power source 12 to the DC/AC inverter 16 simultaneously or in conjunction with the supply of direct current to the DC/AC inverter 16 from the DC/DC converter 18 to power the selected load 26. Where no power is being produced by the primary power source 12, the selected load 26 may be powered entirely by the back-up power source 14. Accordingly, the selected load 26 may be powered in the stand-alone mode by alternating current derived from the primary power source alone, by alternating current derived from the back-up power source alone, or by alternating current derived from both the primary and back-up power sources combined. Since at least a portion of the load 22 is powered in the absence of utility power, the inconvenience associated with the unavailability of grid power is mitigated. When power from the utility grid 20 is restored to the load 22, the DC/AC inverter 16 is disconnected from the selected load 26 and is reconnected with the utility grid 20 via the transfer unit 24. Once this occurs, the power system 10 will again operate in the grid-connected mode.

Where the back-up power source 14 is rechargeable, as in the case of a DC battery, the primary power source 12 can be used to charge the back-up power source 14 to replenish charge lost due to the back-up power source powering the selected load 26 and/or self-discharging. As shown in FIG. 1, the primary power source 12 is electrically connected to the DC/DC converter 18, which may be a bidirectional DC/DC converter. Direct current from the primary power source 12 is supplied to the back-up power source 14 through the DC/DC converter 18 only as needed to charge the back-up power source 14, the back-up power source 14 drawing the current that it needs to maintain a fully charged state. Only an as needed portion of the direct current output of the primary power source 12 is supplied through the DC/DC converter 18 to the back-up power source 14, with the remainder of the primary power source output being supplied to the DC/AC inverter 16 without going through the DC/DC converter 18. Accordingly, the inefficiencies associated with all of the current from the primary power source being supplied through a DC/DC converter prior to being supplied to a DC/AC inverter are eliminated. In order to supply the back-up power source 14 with direct current of appropriate voltage, the bidirectional DC/DC converter 18 converts the voltage of the direct current supplied through the DC/DC converter 18 from the primary power source 12 to the back-up power source 14 from the first voltage to the second voltage. Direct current having the first voltage is supplied from the primary power source 12 as input to the DC/DC converter 18, and direct current having the second voltage is provided as output from the DC/DC converter 18 and is supplied as input to the back-up power source 14. Depending on whether the second voltage is less than or greater than the first voltage, the DC/DC converter 18 decreases or increases the voltage of direct current supplied therethrough from the primary power source 12 to the back-up power source 14. Where the first voltage is 200 to 600 VDC nominal and the second voltage is 96VDC nominal, the DC/DC converter 18 decreases the first voltage from 200 to 600 VDC nominal to 96VDC nominal.

The grid-connected power system 10 can be installed initially without the back-up power source 14 and DC/DC converter 18, which may be provided as an add-on back-up module including or not including the transfer unit 24. The initial system comprising the primary power source 12 and the DC/AC inverter 16, with or without the transfer unit 24, can be designed and installed essentially the same way at essentially the same cost regardless of whether or not the back-up module is to be added at a later time. The initial system can thusly include the high voltage DC/AC inverter 16 for greater efficiencies, and efficiency and economy need not be sacrificed for the contingency of later adding the back-up module.

Figure 2:
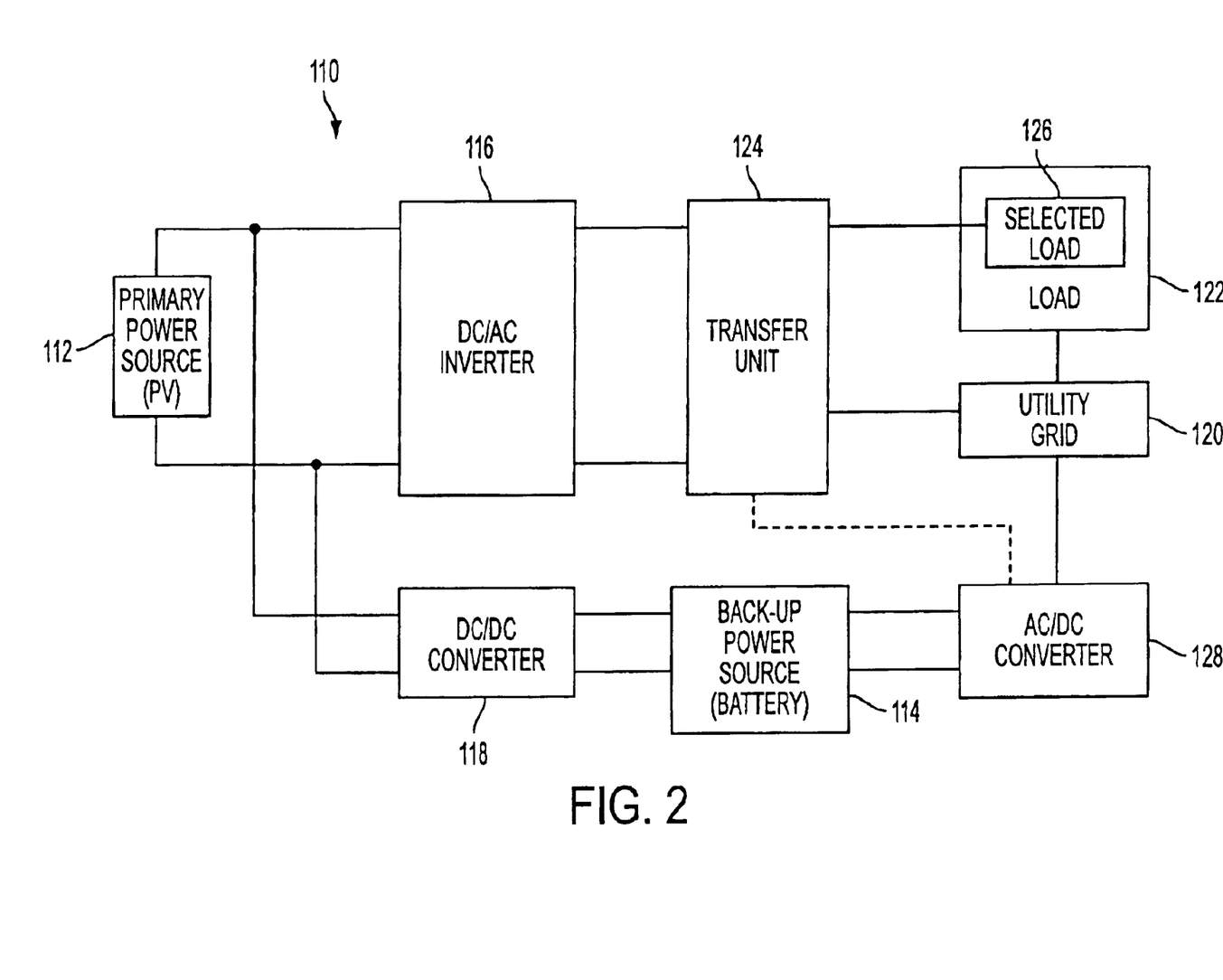
FIG. 2 is a block diagram depicting an alternative grid-connected power system having a back-up power source in accordance with the present invention and representing an alternative method according to the present invention of providing back-up power to a selected load in grid-connected power systems.

An alternative grid-connected power system having a back-up power source is depicted at 110 in FIG. 2 and is representative of a grid-connected power system in which the back-up DC power source is charged using AC electricity. The power system 110 is similar to power system 10 and comprises primary power source 112, back-up power source 114, DC/AC inverter 116 and DC/DC converter 118. The primary power source 112, the back-up power source 114 and the DC/AC inverter 116 are similar to the primary power source 12, the back-up power source 14 and the DC/AC inverter 16. The DC/DC converter 118 converts the voltage of the direct current supplied thereto from the back-up power source 114 from the second voltage to the first voltage to provide a direct current output having the first voltage, with the direct current output of the DC/DC converter 118 being supplied to the DC/AC inverter 116 as described above for power system 10. The first and second voltages for power system 110 may be the same as the first and second voltages described for power system 10. Where the first voltage is 200 to 600 VDC nominal and the second voltage is 96VDC nominal, the DC/DC converter 118 increases the second voltage to the first voltage. However, the DC/DC converter 118 may decrease the second voltage to the first voltage where the back-up power source 114 is of higher voltage than the primary power source 112 and DC/AC inverter 116. The output of the DC/AC inverter 116 is supplied to an electric utility grid 120 via a transfer unit 124 by which the DC/AC inverter 116 is electrically connected with the utility grid 120 when power from the utility grid 120 is available to power the load 122. Is disconnected from the utility grid 120 when power from the utility grid 120 is unavailable to power the load 122, and is electrically connected with the selected load 126 when power from the utility grid 120 is unavailable to power the load 122.

In the power system 110, the back-up power source 114 is charged in the grid-connected mode using AC electricity from the utility grid 120 supplied to the back-up power source 114 through an AC/DC converter 128. The AC/DC converter 128 converts the alternating current supplied from the utility grid 120 into direct current of appropriate voltage to charge the back-up power source 114. The conversion effected by the AC/DC converter 128 may involve decreasing or increasing the voltage of the current from the utility grid depending on whether the original voltage of the alternating current is greater than or less than the second voltage of the back-up power source 114. Alternating current is typically supplied to the AC/DC converter 128 from the utility grid 120 at 120VAC nominal and, where the back-up power source 114 requires direct current having the second voltage as explained above for power system 10, the AC/DC converter 128 decreases, reduces or steps down the voltage of the alternating current from 120VAC nominal to 96VDC nominal. The AC/DC converter 128 thusly converts and reduces the voltage of the alternating current to direct current having the second voltage appropriate for the back-up power source 114.

When power from the utility grid 120 is available to power the load 122, the power system 110 operates in the grid-connected mode with the DC/AC inverter 116 electrically connected to the utility grid via the transfer unit 124. Direct current having the first voltage is supplied from the primary power source 112 to the DC/AC inverter 116 and is converted into alternating current compatible with the alternating current of the utility grid 120, which powers the load 122 as explained above for power system 10. The back-up power source 114 draws alternating current from the utility grid 120 via the AC/DC converter 128 as needed to charge the back-up power source in the grid-connected mode.

When power from the utility grid 120 is unavailable to power the load 122, the DC/AC inverter 116 is automatically disconnected from the utility grid 120 and the power system 110 operates in the stand-alone mode. In the stand-alone mode, the DC/AC inverter 116 is electrically connected with the selected load 126, and direct current from the primary power source 112 and/or the back-up power source 114 is supplied to the DC/AC inverter 116 as needed to power the selected load 126, with direct current from the back-up power source 114 being supplied to the inverter through the DC/DC converter 118. Direct current having the second voltage is supplied from the back-up power source 114 to the DC/DC converter 118, and direct current having the first voltage is supplied from the DC/DC converter 118 to the DC/AC inverter 116. The direct current supplied to the DC/AC inverter 116 is converted to alternating current, typically 120/240VAC, suitable for powering the selected load 126. Of course, direct current having the first voltage may be supplied, as available, from the primary power source 112 to the DC/AC inverter 116 simultaneously or in conjunction with the direct current supplied to the DC/AC inverter 116 from the DC/DC converter 118. In the stand-alone mode, the selected load 126 may be powered by alternating current derived from the primary power source 112 alone, the back-up power source 114 alone or both the primary and back-up power sources combined as described above for power system 10. The DC/AC inverter 116 is disconnected from the selected load 126 and reconnected with the utility grid 120 when power from the utility grid is available to the load 122 for operation of the power system 110 in the grid-connected mode.

When the power system 110 is in the stand-alone mode, the back-up power source 114 may be charged with alternating current produced by the power system itself. As shown by a dotted line in FIG. 2, the DC/AC inverter 116 may be electrically connected with the AC/DC converter 128 via the transfer unit 124 in the stand-alone mode. The alternating current output from the DC/AC inverter 116 not being used to power the selected load 126 is supplied to the AC/DC converter 128 via the transfer unit 124. The AC/DC converter 128 converts the alternating current output from the DC/AC inverter 116 into direct current of appropriate voltage to charge the back-up power source 114. Depending on whether the voltage of the alternating current output of the DC/AC inverter 116 is greater than or less than the second voltage required by the back-up power source 114, the conversion effected by the AC/DC converter 128 may involve decreasing or increasing the voltage of the current therethrough from the original voltage of the alternating current output of the DC/AC inverter 116 to the second voltage required by the back-up power source 114. Where the alternating current output of the DC/AC inverter 116 is 120/240 VAC nominal and the second voltage is 96 VDC nominal, the AC/DC converter 128 decreases the voltage of the current supplied therethrough from the DC/AC inverter 116.

As described above for power system 10, the power system 110 can initially be installed without the back-up power source 114, the DC/DC converter 118 and the AC/DC converter 128, which may be provided as an add-on back-up module including or not including the transfer unit 124. The initial system comprising the primary power source 112 and the DC/AC inverter 116, with or without the transfer unit 124, can be designed and installed essentially the same way at essentially the same cost regardless of whether or not the back-up module is to be subsequently added. The initial system can thusly include the high voltage DC/AC inverter 116 for greater efficiencies without sacrificing efficiency and economy in order to retain the future option of a back-up power source.

With the grid-connected power systems of the present invention, greater grid-connected efficiencies are achieved by allowing a high voltage primary power source and a high voltage DC/AC inverter to be used with a relatively low voltage back-up power source. In particular, standard 96VDC nominal batteries can be used as the back-up power source in conjunction with 200 to 600V nominal primary power sources and DC/AC inverters. The voltages of the back-up power sources do not have to be matched with the voltages of the primary power sources and the DC/AC inverters such that higher voltage inverters can be used for greater conversion efficiencies and reduced costs. The voltage of the back-up power sources can be greater than the voltages of the primary power sources and DC/AC inverters. The grid-connected power systems of the present invention are able to realize efficiencies of about 96–97% compared with efficiencies of about 88% for prior grid-connected PV systems. Direct current of relatively low voltage may be supplied from the back-up power sources to the DC/AC inverters through DC/DC converters which convert the current to a relatively higher voltage supplied as input to the DC/AC inverters. The voltage of direct current supplied from the back-up power sources to the DC/AC inverters may be appropriately increased or decreased from the second voltage to the first voltage. The back-up power sources may be rechargeable, and the back-up power sources may be charged using power from the primary power sources and/or the utility grid. Where direct current from the primary power source is used to charge the back-up power source, inefficiencies are reduced by supplying direct current output of the primary power source through a DC/DC converter only as needed to charge the back-up power source. In addition, the voltage of the direct current output of the primary power source supplied through the DC/DC converter is converted to the appropriate voltage for the back-up power source. A single DC/DC converter or a plurality of DC/DC converters can be used to convert the voltage of the direct current supplied from the primary power source to the back-up power source and/or to convert the voltage of the direct current supplied from the back-up power source to the DC/AC inverter. Bidirectional and unidirectional DC/DC converters can be used in the power systems of the present invention. Where the back-up power source is charged using power from the utility grid, the alternating current of the utility grid is converted to direct current of appropriate voltage for the back-up power source, and an AC/DC converter may be used to effect this conversion. The voltage of alternating current from the utility grid may be appropriately decreased or increased when converted to direct current used to charge the back-up power source. The back-up power source may be charged using alternating current derived from the power system itself by supplying the alternating current output of the DC/AC inverter to the back-up power source via an AC/DC converter. The AC/DC converter converts the alternating current output of the inverter to direct current of appropriate voltage to charge the back-up power source, and this conversion may involve decreasing or increasing the voltage of the current through the AC/DC converter. The power systems may be installed at various locations including residential and commercial buildings as well as other locations having an AC load. The load may be an electrical system of any type including the electrical systems for residential and commercial buildings. The selected load may be any portion of the load including the entire or less than the entire load. The selected load may vary from system to system depending on consumer requirements. The grid-connected power systems can initially be installed without the back-up power sources, and the back-up power sources can be made available as add-on back-up modules capable of being added to systems initially installed without the back-up power sources. Grid-connected power systems initially installed without the back-up modules preserve the option of adding the back-up modules thereto without sacrificing performance and economy in the initial systems. The primary power sources are preferably PV but may comprise other DC power sources including fuel cells and hydroelectric power sources. The back-up power sources are preferably standard lead-acid batteries but may comprise other DC power sources including fuel cells, DC gen-sets, flywheels, small power generators and (ultra) super-capacitors. The back-up power source may be a 96 VDC nominal battery. The battery may be larger or smaller than 96VDC in any suitable number of 12V Increments. Typically, the size of the battery will be limited from a practical standpoint based on the number of cells to be connected and maintained.

Inasmuch as the present invention is subject to various modifications and changes in detail, it is intended that all subject matter discussed above and shown in the accompanying drawings not be taken in a limiting sense.

What is claimed is:

1. A grid-connected power system having a back-up power source, comprising
   a DC/AC inverter providing an alternating current output compatible with the alternating current of a utility grid, said DC/AC inverter being electrically connected with the utility grid to supply said output to the utility grid when power from the utility grid is available to power a load, being disconnected from the utility grid when power from the utility grid is unavailable to power the load, and being electrically connected with a selected portion of the load to supply said output to the selected portion of the load when power from the utility grid is unavailable to power the load;
   a primary power source providing a direct current output having a first voltage supplied as input to said DC/AC inverter;
   a backup power source providing a direct current output having a second voltage, different than said first voltage; and
   a DC/DC converter for receiving said output of said back-up power source when said DC/AC inverter is electrically connected with the selected portion of the load, said DC/DC converter converting the voltage of said output of said back-up power source from said second voltage to said first voltage to provide a direct current output having said first voltage supplied from said DC/DC converter to said DC/AC inverter as needed to power the selected portion of the load.

2. The grid-connected power system recited in claim 1 wherein said first voltage is greater than said second voltage.

3. The grid-connected power system recited in claim 2 wherein said first voltage is in the range of 200 to 600VDC nominal and said second voltage is 96VDC nominal.

4. The grid-connected power system recited in claim 1 wherein said primary power source comprises a photovoltaic (PV) array.

5. The grid-connected power system recited in claim 1 wherein said back-up power source comprises a battery.

6. The grid-connected power system recited in claim 5 wherein said primary power source comprises a photovoltaic (PV) array.

7. The grid-connected power system recited in claim 1 and further comprising a transfer unit electrically connecting said DC/AC inverter with the utility grid when power from the utility grid is available to power the load, automatically disconnecting said DC/AC inverter from the utility grid when power from the utility grid is unavailable to power the load, and automatically connecting said DC/AC inverter with the selected portion of the load when power from the utility grid is unavailable to power the load.

8. The grid-connected power system recited in claim 1 wherein said back-up power source is powered by said primary power source.

9. The grid-connected power system recited in claim 1 wherein said back-up power source is powered by the utility grid.

10. The grid-connected power system recited in claim 1 wherein said back-up power source and said DC/DC converter form an add-on module.

11. A grid-connected power system having a back-up power source, comprising
    a DC/AC inverter providing an alternating current output compatible with the alternating current of a utility grid, said DC/AC inverter being electrically connected with the utility grid to supply said output to the utility grid when power from the utility grid is available to power a load, being disconnected from the utility grid when power from the utility grid is unavailable to power the load, and being electrically connected with a selected portion of the load to supply said output to the selected portion of the load when power from the utility grid is unavailable to power the load;
    a primary power source providing a direct current output supplied to said DC/AC inverter;
    a back-up power source charged by said primary power source, said back-up power source providing a direct current output supplied to said DC/AC inverter as needed to power the selected portion of the load when said DC/AC inverter is electrically connected with the selected portion of the load; and
    a DC/DC converter through which an as needed portion of said output of said primary power source is supplied to said back-up power source only as needed to charge said back-up power source.

12. The grid-connected power system recited in claim 11 wherein said output of said primary power source has a first voltage, said output of said back-up power source has a second voltage, different than said first voltage, said output of said back-up power source is supplied to said DC/AC inverter through said DC/DC converter, said DC/DC converter converting the voltage of said output of said primary power source through said DC/DC converter from said first voltage to said second voltage and converting the voltage of said output of said back-up power source through said DC/DC converter from said second voltage to said first voltage.

13. The grid-connected power system recited in claim 12 wherein said second voltage is less than said first voltage, said DC/DC converter decreases the voltage of said output of said primary power source from said first voltage to said second voltage and increases the voltage of said output of said back-up power source from said second voltage to said first voltage.

14. The grid-connected power system recited in claim 13 wherein said primary power source comprises a photovoltaic (PV) array.

15. The grid-connected power system recited in claim 13 wherein said back-up power source comprises a battery.

16. The grid-connected power system recited in claim 15 wherein said primary power source comprises a photovoltaic (PV) array.

17. A grid-connected power system having a back-up power source, comprising
- a DC/AC inverter providing an alternating current output compatible with the alternating current of a utility grid, said DC/AC inverter being electrically connected with the utility grid to supply said output to the utility grid when power from the utility grid is available to power a load, being disconnected from the utility grid when power from the utility grid is unavailable to power the load, and being electrically connected with a selected portion of the load when power from the utility grid is unavailable to power the load;
- a primary power source providing a direct current output supplied to said DC/AC inverter;
- a back-up power source charged by the utility grid when power from the utility grid is available to power the load, said back-up power source providing a direct current output supplied to said DC/AC inverter when said DC/AC inverter is electrically connected with the selected portion of the load; and
- an AC/DC converter through which alternating current from the utility grid is supplied to said back-up power source as needed to charge said back-up power source, said AC/DC converter converting the alternating current of the utility grid into direct current of appropriate voltage to charge said back-up power source.

18. The grid-connected power system recited in claim 17 wherein said AC/DC converter decreases the voltage of alternating current therethrough from the utility grid.

19. The grid-connected power system recited in claim 17 wherein said primary power source provides a direct current output having a first voltage, said back-up power source provides a direct current output having a second voltage, different than said first voltage, and further including a DC/DC converter through which said output of said back-up power source is supplied to said DC/AC inverter, said DC/DC converter converting the voltage of said output of said back-up power source through said DC/DC converter from said second voltage to said first voltage.

20. The grid-connected power system recited in claim 19 wherein said AC/DC converter decreases the voltage of alternating current therethrough from the utility grid to said second voltage.

21. The grid-connected power system recited in claim 20 wherein said AC/DC converter decreases the voltage of alternating current therethrough from the utility grid from 120/240VAC nominal to 96VDC nominal, said DC/DC converter increases the voltage of said output of said back-up power source from 96VDC nominal to 200 to 600VDC nominal, and said output of said primary power source has a voltage of 200 to 600VDC nominal.

22. The grid-connected power system recited in claim 20 wherein said primary power source comprises a photovoltaic (PV) array.

23. The grid-connected power system recited in claim 20 wherein said back-up power source comprises a battery.

24. The grid-connected power system recited in claim 23 wherein said primary power source comprises a photovoltaic (PV) array.

25. The grid-connected power system recited in claim 17 wherein said DC/AC inverter supplies said alternating current output to said AC/DC converter as needed to charge said back-up power source when power from the utility grid is unavailable to power the load, said AC/DC converter converting said alternating current output of said DC/AC inverter into direct current of appropriate voltage to charge said back-up power source.

26. The grid-connected power system recited in claim 20 wherein said DC/AC inverter supplies said alternating current output to said AC/DC converter as needed to charge said back-up power source when power from the utility grid is unavailable to power the load, said AC/DC converter decreasing the voltage of alternating current therethrough from said DC/AC inverter to said second voltage.

27. The grid-connected power system recited in claim 26 wherein said AC/DC converter decreases the voltage of alternating current therethrough from the utility grid from 120/240 VAC nominal to 96 VDC nominal, said AC/DC converter decreases the voltage of said alternating current output of said DC/AC inverter from 120 VAC nominal to 96 VDC nominal, said DC/DC converter increases the voltage of said output of said back-up power source from 96 VDC nominal to 200 to 600 VDC nominal, and said output of said primary power source has a voltage of 200 to 600 VDC nominal.

28. A method of providing back-up power in a grid-connected power system, 2 comprising the steps of
- providing a direct current output having a first voltage from a primary power source;
- converting the direct current output of the primary power source into alternating current derived from the primary power source;
- supplying the alternating current derived from the primary power source to a utility grid when power from the utility grid is available to power an AC load;
- providing a direct current output having a second voltage, different than the first voltage, from a back-up power source;
- converting the voltage of the direct current output of the back-up power source from the second voltage to the first voltage to obtain a direct current of converted voltage;
- converting the direct current of converted voltage into alternating current derived from the back-up power source; and
- supplying the alternating current derived from the back-up power source to a selected portion of the load when power from the utility grid is unavailable to power the load.

29. The method recited in claim 28 and further including the step of supplying the alternating current derived from the primary power source to the selected portion of the load simultaneously with said step of supplying the alternating current derived from the back-up power source to the selected portion of the load.

30. The method recited in claim 28 wherein said step of converting the direct current output of the primary power source comprises supplying the direct current output of the primary power source through a DC/AC inverter, said step of converting the voltage of the direct current output of the back-up power source includes supplying the direct current output of the back-up power source through a DC/DC converter and said step of converting the direct current of converted voltage comprises supplying the direct current of converted voltage through the DC/AC inverter.

31. The method recited in claim 30 and further including the steps of supplying the direct current output of the primary power source through the DC/DC converter as needed to charge the back-up power source and converting the voltage of the direct current output of the primary power source through the DC/DC converter from the first voltage to the second voltage.

32. The method recited in claim 31 wherein said step of converting the voltage of the direct current output of the back-up power source comprises increasing the voltage of the direct current output of the back-up power source from the second voltage to the first voltage and said step of converting the voltage of the direct current output of the primary power source includes decreasing the voltage of the direct current output of the primary power source from the first voltage to the second voltage.

33. The method recited in claim 32 wherein said step of providing a direct current output having a first voltage comprises providing the direct current having the first voltage from a photovoltaic (PV) array and said step of providing a direct current output having a second voltage comprises supplying the direct current having the second voltage from a battery.

34. The method recited in claim 28 and further including the steps of converting alternating current of the utility grid into direct current of appropriate voltage for the back-up power source and supplying the direct current of appropriate voltage to the back-up power source as needed to charge the back-up power source when power from the utility grid is available to power the load.

35. The method recited in claim 34 wherein said step of converting alternating current of the utility grid comprises supplying the alternating current of the utility grid through an AC/DC converter and decreasing the voltage of the current through the AC/DC converter to the second voltage.

36. The method recited in claim 35 and further including the steps of converting the alternating current derived from the primary power source into direct current of appropriate voltage for the back-up power source and supplying the direct current of appropriate voltage derived from the primary power source to the back-up power source as needed to charge the back-up power source when power from the utility grid is unavailable to power the load.

37. The method recited in claim 36 wherein said step of converting alternating current derived from the primary power source comprises supplying the alternating current derived from the primary power source through the AC/DC converter and decreasing the voltage of the current through the AC/DC converter to the second voltage.

38. The method recited in claim 37 wherein said step of providing a direct current output having a first voltage comprises providing the direct current output having the first voltage from a photovoltaic (PV) array and said step of providing a direct current output having a second voltage comprises providing the direct current output having the second voltage from a battery.

39. The method recited in claim 28 and further including the steps of converting the alternating current derived from the primary power source into direct current of appropriate voltage for the back-up power source and supplying the direct current of appropriate voltage to the back-up power source as needed to charge the back-up power source when power from the utility grid is unavailable to power the load.

40. The method recited in claim 39 wherein said step of converting the alternating current derived from the primary power source comprises supplying the alternating current derived from the primary power source through an AC/DC converter and decreasing the voltage of the current through the AC/DC converter to the second voltage.

41. The method recited in claim 30 and further including the steps of electrically connecting the DC/AC inverter to the utility grid when power from the utility grid is available to power the load, disconnecting the DC/AC inverter from the utility grid when power from the utility grid is unavailable to power the load, and electrically connecting the DC/AC inverter to the selected portion of the load when power from the utility grid is unavailable to power the load.

* * * * *